UNITED STATES PATENT OFFICE.

WILHELM BERGDOLT, OF LEVERKUSEN, NEAR COLOGNE, GERMANY, ASSIGNOR TO SYNTHETIC PATENTS CO., INC., OF NEW YORK, N. Y., A CORPORATION OF NEW YORK.

RED WOOL-DYE.

1,201,544.  Specification of Letters Patent.  Patented Oct. 17, 1916.

No Drawing. Application filed March 27, 1915, Serial No. 17,531. Renewed September 6, 1916. Serial No. 118,784.

*To all whom it may concern:*

Be it known that I, WILHELM BERGDOLT, doctor of philosophy, chemist, citizen of the German Empire, residing at Leverkusen, near Cologne, Germany, have invented new and useful Improvements in Red Wool-Dyes, of which the following is a specification.

I have found that yellow-red to red azo dyestuffs for wool can be obtained by combining in acid solution with the 2.8.6-aminonaphthol sulfonic acid the diazo-compounds of acidylized meta-phenylenediamin sulfonic acid compounds containing the sulfonic group in ortho position to the unsubstituted amino group *e. g.*

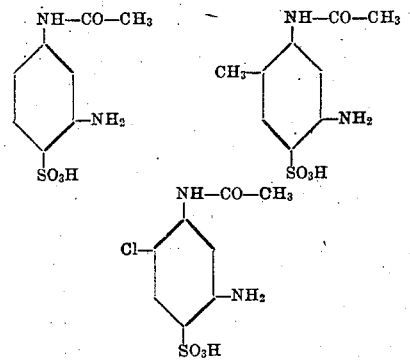

The new dyes are after being dried and pulverized dark powders soluble in water generally with a reddish coloration; yielding upon reduction with zinc powder and acetic acid an acidylized meta-phenylene-diaminsulfonic acid compound and 1.2-diamino-8-naphthol-6-sulfonic acid. They dye wool from yellowish-red to red shades fast to light.

In order to illustrate the new process more fully the following example is given, the parts being by weight: To an aqueous solution of 25.2 parts of acetyl-meta-phenylenediaminsulfonic acid and 6.9 parts of sodium nitrite, hydrochloric acid is added until an acid mixture results. The diazotation is completed after a short time. The diazo compound is then added to a solution of 24 parts of 2-amino-8-naphthol-6-sulfonic acid which solution contains a slight excess of acetic acid. After a 12 hours stirring the mixture is rendered alkaline, the dye is salted out and pressed. It is after being dried and pulverized a dark powder soluble in water with a reddish coloration; yielding upon reduction with zinc powder and acetic acid acetyl-meta-phenylenediamin sulfonic acid and 1.2-diamino-8-naphthol-6-sulfonic acid. It has in a free state most probably the formula:

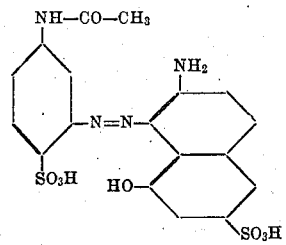

and dyes wool red shades.

I claim:—

1. The herein described new azo dyestuffs for wool which are after being dried and pulverized dark powders soluble in water generally with a reddish coloration; yielding upon reduction with zinc powder and acetic acid an acidylized meta-phenylene-diaminsulfonic acid compound and 1.2-diamino-8-naphthol-6-sulfonic acid; dyeing wool from yellowish-red to red shades fast to light, substantially as described.

2. The new azo dyestuff having in a free state most probably the formula:

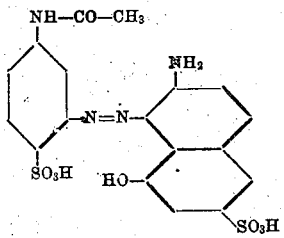

which is after being dried and pulverized a dark powder soluble in water with a reddish coloration; yielding upon reduction with zinc powder and acetic acid acetyl-meta-phenylenediaminsulfonic acid and 1.2-diamino-8-naphthol-6-sulfonic acid; dyeing wool red shades fast to light, substantially as described.

In testimony whereof I have hereunto set my hand in the presence of two subscribing witnesses.

WILHELM BERGDOLT. [L. S.]

Witnesses:
 HELEN NUFER,
 ALBERT NUFER.